(12) United States Patent
Xie et al.

(10) Patent No.: US 11,947,186 B2
(45) Date of Patent: Apr. 2, 2024

(54) OPTICAL IMAGING LENS ASSEMBLY AND FINGERPRINT IDENTIFICATION DEVICE

(71) Applicant: ZHEJIANG SUNNY OPTICS CO., LTD., Zhejiang (CN)

(72) Inventors: Li Xie, Zhejiang (CN); Fujian Dai, Zhejiang (CN); Liefeng Zhao, Zhejiang (CN)

(73) Assignee: ZHEJIANG SUNNY OPTICS CO., LTD., Ningbo (CN)

( * ) Notice: Subject to any disclaimer, the term of this patent is extended or adjusted under 35 U.S.C. 154(b) by 116 days.

(21) Appl. No.: 17/578,503

(22) Filed: Jan. 19, 2022

(65) Prior Publication Data

US 2022/0244491 A1    Aug. 4, 2022

(30) Foreign Application Priority Data

Jan. 29, 2021    (CN) .......................... 202110125652.8

(51) Int. Cl.
| | |
|---|---|
| *G02B 9/12* | (2006.01) |
| *G02B 3/04* | (2006.01) |
| *G06F 21/32* | (2013.01) |
| *G02B 5/08* | (2006.01) |

(52) U.S. Cl.
CPC ................ *G02B 9/12* (2013.01); *G02B 3/04* (2013.01); *G02B 5/0808* (2013.01); *G06F 21/32* (2013.01)

(58) Field of Classification Search
CPC ........ G02B 9/12; G02B 3/04; G02B 13/0035; G02B 13/18; G06F 21/32
See application file for complete search history.

(56) References Cited

U.S. PATENT DOCUMENTS

| | | | |
|---|---|---|---|
| 2021/0200975 A1* | 7/2021 | Yu | G02B 9/12 |
| 2021/0215908 A1* | 7/2021 | Huang | G02B 9/12 |

FOREIGN PATENT DOCUMENTS

| | | | |
|---|---|---|---|
| CN | 105824108 A | | 8/2016 |
| CN | 109196521 A | | 1/2019 |
| CN | 111123489 A | | 5/2020 |
| CN | 111694134 A | | 9/2020 |
| CN | 211653281 U | | 10/2020 |
| JP | 2008164989 A | * | 7/2008 |

OTHER PUBLICATIONS

English Translation of JP2008164989 (Year: 2008).*
Corresponding CN search results.

* cited by examiner

*Primary Examiner* — Alicia M Harrington
(74) *Attorney, Agent, or Firm* — Samson G. Yu (57) ABSTRACT

The disclosure provides an optical imaging lens assembly and a fingerprint identification device with the optical imaging lens assembly. The optical imaging lens assembly sequentially comprises, from an object side to an image side along an optical axis: a first lens with a negative refractive power, an object-side surface thereof being a concave surface; a second lens with a positive refractive power, an object-side surface thereof being a convex surface; and a third lens with a positive refractive power, an object-side surface thereof being a convex surface while an image-side surface being a convex surface. EPD is an entrance pupil diameter of the optical imaging lens assembly, and a total effective focal length f of the optical imaging lens assembly and EPD meet f/EPD<1.65. FOV is a maximum field of view of the optical imaging lens assembly, and FOV meets 125°<FOV<140°.

18 Claims, 6 Drawing Sheets

OPTICAL IMAGING LENS ASSEMBLY AND FINGERPRINT IDENTIFICATION DEVICE

CROSS-REFERENCE TO RELATED APPLICATION(S)

The disclosure claims priority to Chinese Patent Application No. 202110125652.8, filed on Jan. 29, 2021 and entitled "Optical Imaging Lens Assembly and Fingerprint Identification Device", the contents of which are hereby incorporated by reference in its entirety.

TECHNICAL FIELD

The disclosure relates to the field of optical elements, and particularly to an optical imaging lens assembly and a fingerprint identification device with the optical imaging lens assembly.

BACKGROUND

At present, with the development of in-screen fingerprint identification technologies, manufacturers of portable electronic products such as smart phones have gradually started researching how to apply the in-screen fingerprint identification technologies to portable electronic products such as smart phones to make their products more competitive. Since a mobile phone screen such as an Organic Light-Emitting Diode (OLED) screen has relatively high light transmittance, an in-screen fingerprint identification device may be mounted below the OLED screen. The in-screen fingerprint identification device may receive reflected light formed after light emitted by the OLED screen is reflected by a finger to detect a fingerprint.

However, considering that the in-screen fingerprint identification device needs to be matched with a corresponding optical imaging lens assembly, mounting an in-screen fingerprint identification device is likely to cause relatively poor imaging quality due to the characteristics of relatively large size, relatively small field of view and aperture and the like of a conventional optical imaging lens assembly and further affect the working effect of the identification device.

SUMMARY

An embodiment of the disclosure provides an optical imaging lens assembly, which sequentially includes, from an object side to an image side along an optical axis: a first lens with a negative refractive power, an object-side surface thereof being a concave surface; a second lens with a positive refractive power, an object-side surface thereof being a convex surface; and a third lens with a positive refractive power, an object-side surface thereof being a convex surface while an image-side surface being a convex surface. EPD is an entrance pupil diameter of the optical imaging lens assembly, and a total effective focal length f of the optical imaging lens assembly and EPD may meet f/EPD<1.65. FOV is a maximum field of view of the optical imaging lens assembly, and FOV may meet 125°<FOV<140°.

In an implementation mode, at least one mirror surface in the object-side surface of the first lens to the image-side surface of the third lens is an aspheric mirror surface.

In an implementation mode, an effective focal length f1 of the first lens, an effective focal length f2 of the second lens and the total effective focal length f of the optical imaging lens assembly may meet 0.7<(f1+f2)/f<1.9.

In an implementation mode, an effective focal length f3 of the third lens, a curvature radius R6 of the image-side surface of the third lens and a curvature radius R5 of the object-side surface of the third lens may meet 0.1<f3/(R5+R6)<1.1.

In an implementation mode, ImgH is a half of a diagonal length of an effective pixel region on an imaging surface of the optical imaging lens assembly, ImgH and a center thickness CT2 of the second lens on the optical axis may meet 1.8<ImgH/CT2<4.0.

In an implementation mode, TTL is a distance from the object-side surface of the first lens to an imaging surface of the optical imaging lens assembly, TTL and a center thickness CT3 of the third lens on the optical axis may meet 7.0<TTL/CT3<10.0.

In an implementation mode, an effective radius DT11 of the object-side surface of the first lens, an effective radius DT21 of the object-side surface of the second lens and an effective radius DT22 of an image-side surface of the second lens may meet 1.4<DT11/(DT21+DT22)<2.1.

In an implementation mode, an effective radius DT31 of the object-side surface of the third lens and an effective radius DT21 of the object-side surface of the second lens may meet 1.3<DT21/DT31<2.6.

In an implementation mode, an Abbe number V1 of the first lens may meet 50<V1<70.

In an implementation mode, f23 is a combined focal length of the second lens and the third lens, f23 and the total effective focal length f of the optical imaging lens assembly may meet 1.6<f23/f<2.4.

In an implementation mode, SAG11 is a distance from an intersection point of the object-side surface of the first lens and the optical axis to an effective radius vertex of the object-side surface of the first lens on the optical axis, SAG12 is a distance from an intersection point of an image-side surface of the first lens and the optical axis to an effective radius vertex of the image-side surface of the first lens on the optical axis, and SAG11, SAG12 and a spacing distance T12 of the first lens and the second lens on the optical axis may meet 1.2<(SAG11+SAG12)/T12<1.9.

In an implementation mode, an edge thickness ET1 of the first lens and a center thickness CT1 of the first lens on the optical axis may meet 1.9<ET1/CT1<2.5.

In an implementation mode, the optical imaging lens assembly further includes a diaphragm. SL is a distance from the diaphragm to an imaging surface of the optical imaging lens assembly on the optical axis, TTL is a distance from the object-side surface of the first lens to the imaging surface of the optical imaging lens assembly on the optical axis, SL and TLL may meet 2.0<TTL/SL<2.5.

In an implementation mode, TTL is a distance from the object-side surface of the first lens to an imaging surface of the optical imaging lens assembly on the optical axis, BFL is a distance from the image-side surface of the third lens to the imaging surface of the optical imaging lens assembly on the optical axis, TTL and BFL may meet 2.7<TTL/BFL<3.4.

Another embodiment of the disclosure also provides an optical imaging lens assembly, which sequentially includes, from an object side to an image side along an optical axis: a first lens with a negative refractive power, an object-side surface thereof being a concave surface; a second lens with a positive refractive power, an object-side surface thereof being a convex surface; and a third lens with a positive refractive power, an object-side surface thereof being a convex surface while an image-side surface being a convex surface. EPD is an entrance pupil diameter of the optical imaging lens assembly, and a total effective focal length f of the optical imaging lens assembly and EPD may meet f/EPD<1.65. TTL is a distance from the object-side surface of the first lens to an imaging surface of the optical imaging lens assembly on the optical axis, TTL and a center thickness CT3 of the third lens on the optical axis may meet 7.0<TTL/CT3<10.0.

In an implementation mode, an effective focal length f1 of the first lens, an effective focal length f2 of the second lens and the total effective focal length f of the optical imaging lens assembly may meet 0.7<(f1+f2)/f<1.9.

In an implementation mode, ImgH is a half of a diagonal length of an effective pixel region on the imaging surface of the optical imaging lens assembly, ImgH and a center thickness CT2 of the second lens on the optical axis may meet 1.8<ImgH/CT2<4.0.

In an implementation mode, an effective radius DT11 of the object-side surface of the first lens, an effective radius DT21 of the object-side surface of the second lens and an effective radius DT22 of an image-side surface of the second lens may meet 1.4<DT11/(DT21+DT22)<2.1.

In an implementation mode, an effective radius DT31 of the object-side surface of the third lens and an effective radius DT21 of the object-side surface of the second lens may meet 1.3<DT21/DT31<2.6.

In an implementation mode, an Abbe number V1 of the first lens may meet 50<V1<70.

In an implementation mode, f23 is a combined focal length of the second lens and the third lens, f23 and the total effective focal length f of the optical imaging lens assembly may meet 1.6<f23/f<2.4.

In an implementation mode, SAG11 is a distance from an intersection point of the object-side surface of the first lens and the optical axis to an effective radius vertex of the object-side surface of the first lens on the optical axis, SAG12 is a distance from an intersection point of an image-side surface of the first lens and the optical axis to an effective radius vertex of the image-side surface of the first lens on the optical axis, and SAG11, SAG12 and a spacing distance T12 of the first lens and the second lens on the optical axis may meet 1.2<(SAG11+SAG12)/T12<1.9.

In an implementation mode, an edge thickness ET1 of the first lens and a center thickness CT1 of the first lens on the optical axis may meet 1.9<ET1/CT1<2.5.

In an implementation mode, the optical imaging lens assembly further includes a diaphragm. SL is a distance from the diaphragm to the imaging surface of the optical imaging lens assembly on the optical axis, TTL is a distance from the object-side surface of the first lens to the imaging surface of the optical imaging lens assembly on the optical axis, SL and TLL may meet 2.0<TTL/SL<2.5.

In an implementation mode, TTL is a distance from the object-side surface of the first lens to the imaging surface of the optical imaging lens assembly on the optical axis, BFL is a distance from the image-side surface of the third lens to the imaging surface of the optical imaging lens assembly on the optical axis, TTL and BFL may meet 2.7<TTL/BFL<3.4.

In an implementation mode, FOV is a maximum field of view of the optical imaging lens assembly, and FOV may meet 125°<FOV<140°.

In an implementation mode, an effective focal length f3 of the third lens, a curvature radius R6 of the image-side surface of the third lens and a curvature radius R5 of the object-side surface of the third lens may meet 0.1<f3/(R5+R6)<1.1.

Another embodiment of the disclosure provides a fingerprint identification device, which includes: the above-mentioned optical imaging lens assembly, further including a glass screen on an object side; and an image sensor, configured to convert an optical signal entering the image sensor from the optical imaging lens assembly into an electric signal.

According to the disclosure, three lenses are adopted, and the refractive power and surface types of each lens, the center thickness of each lens, on-axis distances between the lenses and the like are configured reasonably to achieve at least one of beneficial effects of large field of view, small size, large aperture, high imaging quality and the like of the optical imaging lens assembly.

BRIEF DESCRIPTION OF THE DRAWINGS

The other features, objectives and advantages of the disclosure become more apparent upon reading detailed descriptions made to unrestrictive implementation modes with reference to the following drawings.

DETAILED DESCRIPTION OF THE EMBODIMENTS

In order to understand the disclosure better, more detailed descriptions will be made to each aspect of the disclosure with reference to the drawings. It is to be understood that these detailed descriptions are only descriptions about the exemplary implementation modes of the disclosure and not intended to limit the scope of the disclosure in any manner. In the whole specification, the same reference sign numbers represent the same components. Expression "and/or" includes any or all combinations of one or more in associated items that are listed.

It should be noted that, in this description, the expressions of first, second, third, and the like are only used to distinguish one feature from another feature, and do not represent any limitation to the feature. Thus, a first lens discussed below could also be referred to as a second lens or a third lens without departing from the teachings of the disclosure.

In the drawings, the thickness, size and shape of the lens have been slightly exaggerated for ease illustration. In particular, a spherical shape or aspheric shape shown in the drawings is shown by some embodiments. That is, the spherical shape or the aspheric shape is not limited to the spherical shape or aspheric shape shown in the drawings. The drawings are by way of example only and not strictly to scale.

Herein, a paraxial region refers to a region nearby an optical axis. If a lens surface is a convex surface and a position of the convex surface is not defined, it indicates that the lens surface is a convex surface at least in the paraxial region; and if a lens surface is a concave surface and a position of the concave surface is not defined, it indicates that the lens surface is a concave surface at least in the paraxial region. A surface, closest to a shot object, of each lens is called an object-side surface of the lens, and a surface, closest to an imaging surface, of each lens is called an image-side surface of the lens.

It should also be understood that terms "include", "including", "have", "contain", and/or "containing", used in the specification, represent existence of a stated characteristic, component and/or part but do not exclude existence or addition of one or more other characteristics, components and parts and/or combinations thereof. In addition, expressions like "at least one in . . . " may appear after a list of listed characteristics not to modify an individual component in the list but to modify the listed characteristics. Moreover, when the implementation modes of the disclosure are described, "may" is used to represent "one or more implementation modes of the disclosure". Furthermore, term "exemplary" refers to an example or exemplary description.

Unless otherwise defined, all terms (including technical terms and scientific terms) used in the disclosure have the same meanings usually understood by those of ordinary skill in the art of the disclosure. It is also to be understood that the terms (for example, terms defined in a common dictionary) should be explained to have meanings consistent with the meanings in the context of a related art and may not be explained with ideal or excessively formal meanings, unless clearly defined like this in the disclosure.

It is to be noted that the embodiments in the disclosure and characteristics in the embodiments may be combined without conflicts. The disclosure will be described below with reference to the drawings and in combination with the embodiments in detail.

The features, principles and other aspects of the disclosure will be described below in detail.

An optical imaging lens assembly according to an exemplary implementation mode of the disclosure may include, for example, three lenses, i.e., a first lens, a second lens and a third lens respectively. The three lenses are sequentially arranged from an object side to an image side along an optical axis. There may be a spacing distance between any two adjacent lenses in the first lens to the third lens.

In an exemplary implementation mode, the first lens may have a negative refractive power, and an object-side surface thereof may be a concave surface. The second lens may have a positive refractive power, and an object-side surface thereof may be a convex surface. The third lens has a positive refractive power, and an object-side surface may be a convex surface while an image-side surface may be a convex surface.

In an exemplary implementation mode, the refractive power of the first lens, the second lens and the third lens is configured reasonably, so that an overall aberration of the optical imaging lens assembly may be reduced effectively, and the sensitivity of the optical imaging lens assembly may be reduced. The object-side surface of the first lens is set to be a concave surface, the object-side surface of the second lens is set to be a convex surface, and the third lens is set to have a convex-convex surface type, so that the arrangement of the whole lens assembly is facilitated, and the lens assembly is more practical.

In an exemplary implementation mode, the optical imaging lens assembly according to the disclosure may meet $f/EPD<1.65$, wherein f is a total effective focal length of the optical imaging lens assembly, and EPD is an entrance pupil diameter of the optical imaging lens assembly. $f/EPD<1.65$ is met, so that the luminous flux of the lens assembly may be increased effectively, the relative illumination may be improved, the identification accuracy of the lens assembly may be improved, and furthermore, the imaging quality of the lens assembly in a relatively dark environment may be improved well.

In an exemplary implementation mode, the optical imaging lens assembly according to the disclosure may meet $125°<FOV<140°$, wherein FOV is a maximum field of view of the optical imaging lens assembly. More specifically, FOV may further meet $125°<FOV<131°$. Meeting $125°<FOV<140°$ is favorable for reducing an F-number of the lens assembly to endow the lens assembly with a relatively wide imaging range and improve an identification range of the lens assembly.

In an exemplary implementation mode, the optical imaging lens assembly according to the disclosure may meet $0.7<(f1+f2)/f<1.9$, wherein f1 is an effective focal length of the first lens, f2 is an effective focal length of the second lens, and f is a total effective focal length of the optical imaging lens assembly. More specifically, f1, f2 and f may further meet $0.8<(f1+f2)/f<1.9$. Meeting $0.7<(f1+f2)/f<1.9$ is favorable for improving the imaging quality of the lens assembly and reducing the sensitivity of the lens assembly.

In an exemplary implementation mode, the optical imaging lens assembly according to the disclosure may meet $0.1<f3/(R5+R6)<1.1$, wherein f3 is an effective focal length of the third lens, R6 is a curvature radius of the image-side surface of the third lens, and R5 is a curvature radius of the object-side surface of the third lens. $0.1<f3/(R5+R6)<1.1$ is met, so that the size of the lens assembly may be reduced effectively, the refractive power of the third lens may be configured reasonably to avoid the excessive concentration of the refractive power on the third lens, aberrations of the other lenses may be corrected, and the third lens may also keep relatively high in processibility.

In an exemplary implementation mode, the optical imaging lens assembly according to the disclosure may meet $1.8<ImgH/CT2<4.0$, wherein ImgH is a half of a diagonal length of an effective pixel region on an imaging surface of the optical imaging lens assembly, and CT2 is a center thickness of the second lens on the optical axis. Meeting $1.8<ImgH/CT2<4.0$ is favorable for achieving an ultra-thin design and high resolution of the optical imaging lens assembly, thereby making the optical imaging lens assembly more applicable to more and more ultra-thin electronic products on the market.

In an exemplary implementation mode, the optical imaging lens assembly according to the disclosure may meet $7.0<TTL/CT3<10.0$, wherein TTL is a distance from the object-side surface of the first lens to an imaging surface of the optical imaging lens assembly on the optical axis, and CT3 is a center thickness of the third lens on the optical axis. More specifically, TTL and CT3 may further meet $7.1<TTL/CT3<9.7$. $7.0<TTL/CT3<10.0$ is met, so that a longitudinal spherical aberration of the lens assembly and a ghost image in the center of the image surface may be improved, the structural stability of the lens assembly may also be enhanced, a chromatic aberration and distortion of the lens assembly may be balanced effectively, and difficulties in machining caused by an excessively small thickness of the lens may be avoided.

In an exemplary implementation mode, the optical imaging lens assembly according to the disclosure may meet $1.4<DT11/(DT21+DT22)<2.1$, wherein DT11 is an effective radius of the object-side surface of the first lens, DT21 is an effective radius of the object-side surface of the second lens, and DT22 is an effective radius of an image-side surface of the second lens. More specifically, DT11, DT21 and DT22 may further meet $1.4<DT11/(DT21+DT22)<2.0$. $1.4<DT11/(DT21+DT22)<2.1$ is met, so that the luminous flux of the lens assembly may be increased effectively, the relative illumination of the lens assembly in the whole field of view, particularly a marginal field of view, may be improved, and furthermore, the lens assembly still has relatively high imaging quality even in a relatively dark environment.

In an exemplary implementation mode, the optical imaging lens assembly according to the disclosure may meet $1.3<DT21/DT31<2.6$, wherein DT31 is an effective radius of the object-side surface of the third lens, and DT21 is an effective radius of the object-side surface of the second lens. $1.3<DT21/DT31<2.6$ is met, so that the luminous flux of the lens assembly may be increased effectively, the relative illumination of the lens assembly in the whole field of view, particularly a marginal field of view, may be improved, and furthermore, the lens assembly still has relatively high imaging quality even in a relatively dark environment.

In an exemplary implementation mode, the optical imaging lens assembly according to the disclosure may meet $50<V1<70$, wherein V1 is an Abbe number of the first lens. More specifically, V1 may further meet $55<V1<58$. Meeting $50<V1<70$ is favorable for effectively eliminating a chromatic aberration of the optical imaging lens assembly to improve the resolution of the image surface.

In an exemplary implementation mode, the optical imaging lens assembly according to the disclosure may meet $1.6<f23/f<2.4$, wherein f23 is a combined focal length of the second lens and the third lens, and f is a total effective focal length of the optical imaging lens assembly. $1.6<f23/f<2.4$ is met, so that more refractive power of the lens assembly may be distributed to the second lens and the third lens, the aberration correction capability of the lens assembly may be improved well, and meanwhile, the size of the lens assembly may be reduced effectively.

In an exemplary implementation mode, the optical imaging lens assembly according to the disclosure may meet $1.2<(SAG11+SAG12)/T12<1.9$, wherein SAG11 is a distance from an intersection point of the object-side surface of the first lens and the optical axis to an effective radius vertex of the object-side surface of the first lens on the optical axis, SAG12 is a distance from an intersection point of an image-side surface of the first lens and the optical axis to an effective radius vertex of the image-side surface of the first lens on the optical axis, and T12 is a spacing distance of the first lens and the second lens on the optical axis. More specifically, SAG11, SAG12 and T12 may further meet $1.3<(SAG11+SAG12)/T12<1.8$. Meeting $1.2<(SAG11+SAG12)/T12<1.9$ is favorable for regulating a chief ray angle of the optical imaging lens assembly and may effectively improve the relative illumination of the optical imaging lens assembly and improve the resolution of the image surface.

In an exemplary implementation mode, the optical imaging lens assembly according to the disclosure may meet $1.9<ET1/CT1<2.5$, wherein ET1 is an edge thickness of the first lens, and CT1 is a center thickness of the first lens on the optical axis. More specifically, ET1 and CT1 may further meet $2.0<ET1/CT1<2.5$. $1.9<ET1/CT1<2.5$ is met, so that the thickness sensitivity of the lens assembly may be reduced, and a field curvature of the lens assembly may be corrected.

In an exemplary implementation mode, the optical imaging lens assembly according to the disclosure may meet $2.7<TTL/BFL<3.4$, wherein TTL is a distance from the object-side surface of the first lens to an imaging surface of the optical imaging lens assembly on the optical axis, and BFL is a distance from the image-side surface of the third lens to the imaging surface of the optical imaging lens assembly on the optical axis. Meeting $2.7<TTL/BFL<3.4$ is favorable for achieving an ultra-thin design and high resolution of the optical imaging lens assembly.

In an exemplary implementation mode, the optical imaging lens assembly according to the disclosure further includes a diaphragm arranged between the second lens and the third lens. The optical imaging lens assembly according to the disclosure may meet $2.0<TTL/SL<2.5$, wherein SL is a distance from the diaphragm to an imaging surface of the optical imaging lens assembly on the optical axis, and TTL is a distance from the object-side surface of the first lens to the imaging surface of the optical imaging lens assembly on the optical axis. More specifically, TTL and SL may further meet $2.0<TTL/SL<2.3$. Meeting $2.0<TTL/SL<2.5$ is favorable for achieving an imaging effect of large image surface to further improve the optical performance of the lens assembly.

In an exemplary implementation mode, the optical imaging lens assembly according to the disclosure further includes a glass screen arranged between the object side and the first lens. Optionally, the optical imaging lens assembly may further include an optical filter configured to correct the chromatic aberration and/or protective glass configured to protect a photosensitive element on the imaging surface.

The optical imaging lens assembly according to the implementation mode of the disclosure may adopt multiple lenses, for example, the above-mentioned three. The refractive power and surface types of each lens, the center thickness of each lens, on-axis distances between the lenses and the like may be reasonably configured to effectively converge incident light, reduce a total track length of the imaging lens assembly, improve the machinability of the imaging lens assembly and ensure that the optical imaging lens assembly is more favorable for production and machining. The disclosure discloses an optical imaging lens assembly with the characteristics of, for example, small size, large field of view, large aperture, high imaging quality, etc. The optical imaging lens assembly according to the disclosure may be used for an in-screen fingerprint identification device. The in-screen fingerprint identification device with the above-mentioned optical imaging lens assembly has at least one of advantages of high identification accuracy, wide identification range, etc.

Figure 1:
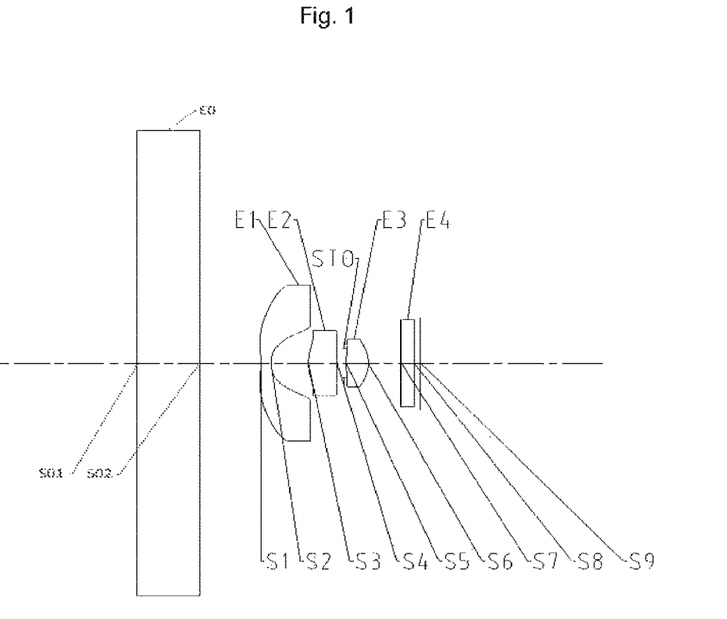
FIG. 1 shows a structure diagram of an optical imaging lens assembly according to embodiment 1 of the disclosure.

In the implementation mode of the disclosure, at least one of mirror surfaces of each lens is an aspheric mirror surface. That is, at least one mirror surface in the object-side surface of the first lens to the image-side surface of the third lens is an aspheric mirror surface. An aspheric lens has a characteristic that a curvature keeps changing from a center of the lens to a periphery of the lens. Unlike a spherical lens with a constant curvature from a center of the lens to a periphery of the lens, the aspheric lens has a better curvature radius characteristic and the advantages of improving distortions and improving astigmatic aberrations. With the adoption of the aspheric lens, astigmatic aberrations during imaging may be eliminated as much as possible, thereby improving the imaging quality. Optionally, at least one of the object-side surface and image-side surface of each of the first lens, the second lens and the third lens is an aspheric mirror surface.

surface S6 is a convex surface. The optical filter E4 has an object-side surface S7 and an image-side surface S8. Light from an object sequentially penetrates through each of the surfaces S01 to S8 and is finally imaged on the imaging surface S9.

Table 1 shows a basic parameter table of the optical imaging lens assembly of embodiment 1, and units of the curvature radius, the thickness/distance and the focal length are all millimeter (mm).

TABLE 1

| Surface number | Surface type | Curvature radius | Thickness/ distance | Material Refractive index | Abbe number | Focal length | Conic coefficient |
|---|---|---|---|---|---|---|---|
| OBJ | Spherical | Infinite | 1.0332E−06 | | | | |
| S01 | Spherical | Infinite | 1.0332 | 1.52 | 64.2 | | |
| S02 | Spherical | Infinite | 1.0000 | | | | |
| S1 | Aspherical | −2.4165 | 0.1666 | 1.54 | 56.1 | −0.72 | −75.5149 |
| S2 | Aspherical | 0.4811 | 0.6166 | | | | −0.4063 |
| S3 | Aspherical | 0.7897 | 0.4700 | 1.54 | 56.1 | 1.30 | −1.2930 |
| S4 | Aspherical | −5.4577 | 0.1125 | | | | −97.2907 |
| STO | Spherical | Infinite | 0.0391 | | | | |
| S5 | Aspherical | 1.6980 | 0.3622 | 1.54 | 56.1 | 0.77 | −43.5221 |
| S6 | Aspherical | −0.5168 | 0.5316 | | | | −0.7984 |
| S7 | Spherical | Infinite | 0.2100 | 1.52 | 64.2 | | |
| S8 | Spherical | Infinite | 0.1114 | | | | |
| S9 | Spherical | Infinite | | | | | |

Optionally, both the object-side surface and image-side surface of each of the first lens, the second lens and the third lens are aspheric mirror surfaces.

However, those skilled in the art should know that the number of the lenses forming the optical imaging lens assembly may be changed without departing from the technical solutions claimed in the disclosure to achieve each result and advantage described in the specification. For example, although descriptions are made in the implementation mode with three lenses as an example, the optical imaging lens assembly is not limited to three lenses. If necessary, the optical imaging lens assembly may further include another number of lenses.

Specific embodiments applied to the optical imaging lens assembly of the above-mentioned implementation mode will further be described below with reference to the drawings.

Embodiment 1

An optical imaging lens assembly according to embodiment 1 of the disclosure will be described below with reference to FIGS. 1 to 2B. FIG. 1 shows a structure diagram of an optical imaging lens assembly according to embodiment 1 of the disclosure.

As shown in FIG. 1, the optical imaging lens assembly sequentially includes, from an object side to an image side, a glass screen E0, a first lens E1, a second lens E2, a diaphragm STO, a third lens E3, an optical filter E4, and an imaging surface S9.

The glass screen E0 has an object-side surface S01 and an image-side surface S02. The first lens E1 has a negative refractive power, an object-side surface S1 thereof is a concave surface, while an image-side surface S2 is a concave surface. The second lens E2 has a positive refractive power, an object-side surface S3 thereof is a convex surface, while an image-side surface S4 is a convex surface. The third lens E3 has a positive refractive power, an object-side surface S5 thereof is a convex surface, while an image-side In the example, a total effective focal length f of the optical imaging lens assembly is 0.39 mm. TTL is a total length of the optical imaging lens assembly (i.e., a distance from the object-side surface S1 of the first lens E1 to the imaging surface S9 of the optical imaging lens assembly on an optical axis), and TTL is 2.62 mm. ImgH is a half of a diagonal length of an effective pixel region on the imaging surface S9 of the optical imaging lens assembly, ImgH is 0.92 mm. FOV is a maximum field of view of the optical imaging lens assembly, and FOV is 127.7°.

In embodiment 1, both the object-side surface and image-side surface of any lens in the first lens E1 to the third lens E3 are aspheric surfaces. A surface type x of each aspheric lens may be defined through, but not limited to, the following aspheric surface formula:

$$x = \frac{ch^2}{1+\sqrt{1-(k+1)c^2h^2}} + \sum A_i h^i, \quad (1)$$

wherein x is a distance vector height from a vertex of the aspheric surface when the aspheric surface is at a height of h along the optical axis direction; c is a paraxial curvature of the aspheric surface, c=1/R (namely, the paraxial curvature c is a reciprocal of the curvature radius R in Table 1); k is a conic coefficient; and Ai is a correction coefficient of the i-th order of the aspheric surface. Table 2 shows high-order coefficients $A_4$, $A_6$, $A_8$, $A_{10}$, $A_{12}$, $A_{14}$, $A_{16}$, $A_{18}$ and $A_{20}$ that can be used for the aspheric mirror surfaces S1-S6 in embodiment 1.

TABLE 2

| Surface number | A4 | A6 | A8 | A10 | A12 |
|---|---|---|---|---|---|
| S1 | 2.0639E−01 | 3.3110E+00 | −1.4517E+01 | 3.0257E+01 | −3.7197E+01 |
| S2 | 4.0473E+00 | −1.2053E+02 | 2.2551E+03 | −2.1855E+04 | 1.2513E+05 |
| S3 | −1.1893E+00 | 9.7269E+00 | −4.0899E+01 | −1.0318E+03 | 1.4778E+04 |
| S4 | −2.6403E−01 | 2.9424E+01 | −2.8791E+03 | 1.2434E+05 | −2.9234E+06 |
| S5 | −5.7280E+00 | 6.2746E+02 | −3.5345E+04 | 1.1602E+06 | −2.3304E+07 |
| S6 | 2.0851E+00 | −9.5817E+01 | 3.2974E+03 | −6.4781E+04 | 7.8140E+05 |

| Surface number | A14 | A16 | A18 | A20 |
|---|---|---|---|---|
| S1 | 2.8168E+01 | −1.2887E+01 | 3.2611E+00 | −3.4934E−01 |
| S2 | −4.4012E+05 | 9.3326E+05 | −1.0984E+06 | 5.5181E+05 |
| S3 | −9.1681E+04 | 3.0550E+05 | −5.2616E+05 | 3.6752E+05 |
| S4 | 4.0140E+07 | −3.2037E+08 | 1.3741E+09 | −2.4363E+09 |
| S5 | 2.9047E+08 | −2.1927E+09 | 9.1812E+09 | −1.6354E+10 |
| S6 | −5.8826E+06 | 2.7058E+07 | −6.9915E+07 | 7.8105E+07 |

Figure 2A:
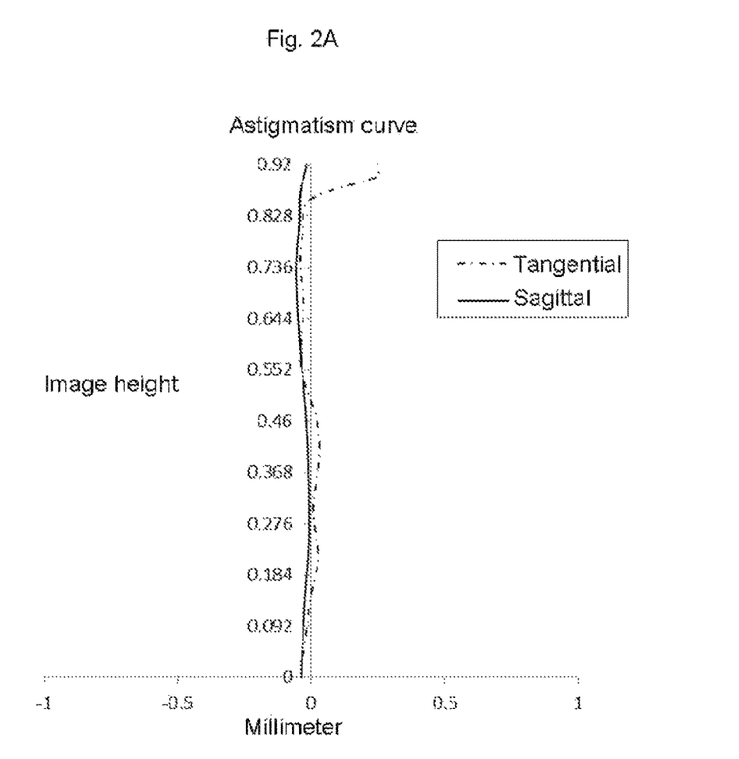
FIGS. 2A and 2B show an astigmatism curve and a distortion curve of an optical imaging lens assembly according to embodiment 1 respectively.
Figure 2B:
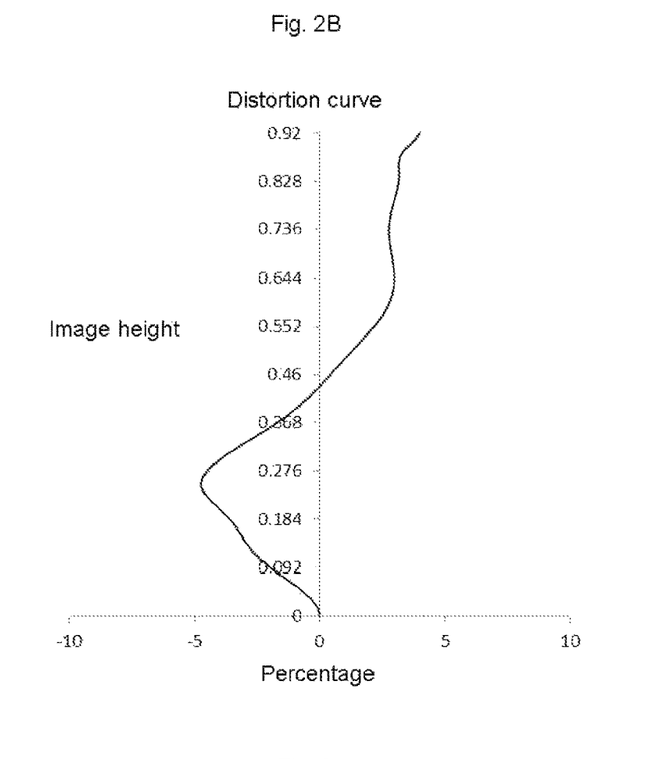

FIG. 2A shows an astigmatism curve of the optical imaging lens assembly according to embodiment 1 to represent a tangential image surface curvature and a sagittal image surface curvature. FIG. 2B shows a distortion curve of the optical imaging lens assembly according to embodiment 1 to represent distortion values corresponding to different image heights. According to FIGS. 2A and 2B, it can be seen that the optical imaging lens assembly provided in embodiment 1 may achieve high imaging quality.

Embodiment 2

Figure 3:
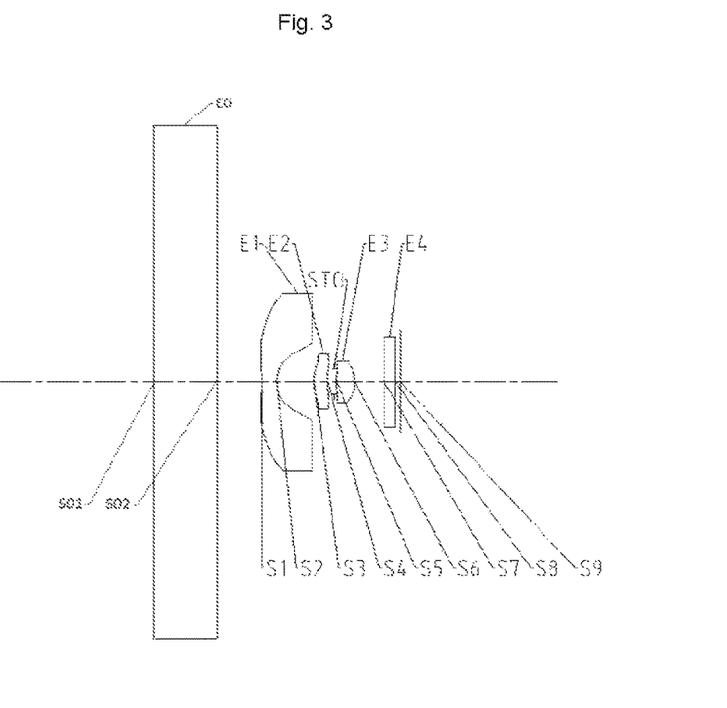
FIG. 3 shows a structure diagram of an optical imaging lens assembly according to embodiment 2 of the disclosure.

An optical imaging lens assembly according to embodiment 2 of the disclosure will be described below with reference to FIGS. 3 to 4B. In the embodiment and the following embodiments, part of descriptions similar to those about embodiment 1 are omitted for simplicity. FIG. 3 shows a structure diagram of an optical imaging lens assembly according to embodiment 2 of the disclosure.

As shown in FIG. 3, the optical imaging lens assembly sequentially includes, from an object side to an image side, a glass screen E0, a first lens E1, a second lens E2, a diaphragm STO, a third lens E3, an optical filter E4, and an imaging surface S9.

The glass screen E0 has an object-side surface S01 and an image-side surface S02. The first lens E1 has a negative refractive power, an object-side surface S1 thereof is a concave surface, while an image-side surface S2 is a concave surface. The second lens E2 has a positive refractive power, an object-side surface S3 thereof is a convex surface, while an image-side surface S4 is a concave surface. The third lens E3 has a positive refractive power, an object-side surface S5 thereof is a convex surface, while an image-side surface S6 is a convex surface. The optical filter E4 has an object-side surface S7 and an image-side surface S8. Light from an object sequentially penetrates through each of the surfaces S01 to S8 and is finally imaged on the imaging surface S9.

In the example, a total effective focal length f of the optical imaging lens assembly is 0.36 mm. TTL is a total length of the optical imaging lens assembly, and TTL is 2.63 mm. ImgH is a half of a diagonal length of an effective pixel region on the imaging surface S9 of the optical imaging lens assembly, ImgH is 0.85 mm. FOV is a field of view of the optical imaging lens assembly, and FOV is maximally 127.8°.

Table 3 shows a basic parameter table of the optical imaging lens assembly of embodiment 2, and units of the curvature radius, the thickness/distance and the focal length are all millimeter (mm). Table 4 shows high-order coefficients that can be used for each aspheric mirror surface in embodiment 2. A surface type of each aspheric surface may be defined by the formula (1) given in embodiment 1.

TABLE 3

| Surface number | Surface type | Curvature radius | Thickness/ distance | Refractive index | Abbe number | Focal length | Conic coefficient |
|---|---|---|---|---|---|---|---|
| OBJ | Spherical | Infinite | 1.2108E−06 | | | | |
| S01 | Spherical | Infinite | 1.2108 | 1.52 | 64.2 | | |
| S02 | Spherical | Infinite | 0.8500 | | | | |
| S1 | Aspherical | −2.4177 | 0.2790 | 1.54 | 56.1 | −0.79 | −99.0000 |
| S2 | Aspherical | 0.5442 | 0.7142 | | | | −0.4289 |
| S3 | Aspherical | 0.6994 | 0.2559 | 1.54 | 56.1 | 1.45 | −3.6627 |
| S4 | Aspherical | 5.1808 | 0.1270 | | | | 7.7673 |
| STO | Spherical | Infinite | 0.0435 | | | | |
| S5 | Aspherical | 2.1888 | 0.3449 | 1.54 | 56.1 | 0.70 | 0.0000 |
| S6 | Aspherical | −0.4364 | 0.5609 | | | | −0.6837 |
| S7 | Spherical | Infinite | 0.2100 | 1.52 | 64.2 | | |
| S8 | Spherical | Infinite | 0.0900 | | | | |
| S9 | Spherical | Infinite | | | | | |

TABLE 4

| Surface number | A4 | A6 | A8 | A10 | A12 |
|---|---|---|---|---|---|
| S1 | 9.2203E−02 | 1.2834E−01 | 2.8772E−01 | −1.0903E+00 | 1.2391E+00 |
| S2 | −3.0462E+00 | 7.9661E+01 | −9.2194E+02 | 6.7131E+03 | −3.0482E+04 |
| S3 | −2.5648E−01 | 1.4499E+01 | −4.6212E+02 | 6.3906E+03 | −5.7129E+04 |
| S4 | 3.0390E+00 | −4.8819E+02 | 2.8698E+04 | −9.0772E+05 | 1.6804E+07 |
| S5 | 0.0000E+00 | 0.0000E+00 | 0.0000E+00 | 0.0000E+00 | 0.0000E+00 |
| S6 | 2.1744E+01 | −1.2819E+03 | 4.1301E+04 | −7.8355E+05 | 9.2221E+06 |

| Surface number | A14 | A16 | A18 | A20 |
|---|---|---|---|---|
| S1 | −7.1347E−01 | 2.2629E−01 | −3.7668E−02 | 2.5721E−03 |
| S2 | 8.6259E+04 | −1.4881E+05 | 1.4339E+05 | −5.9205E+04 |
| S3 | 3.1368E+05 | −9.8718E+05 | 1.6255E+06 | −1.0850E+06 |
| S4 | −1.8720E+08 | 1.2334E+09 | −4.4185E+09 | 6.6210E+09 |
| S5 | 0.0000E+00 | 0.0000E+00 | 0.0000E+00 | 0.0000E+00 |
| S6 | −6.8171E+07 | 3.0836E+08 | −7.8128E+08 | 8.5079E+08 |

Figure 4A:
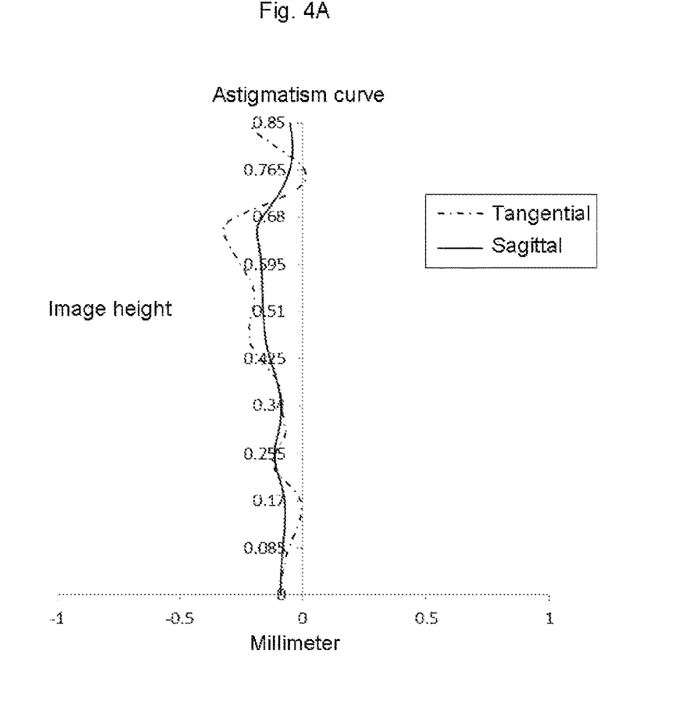
FIGS. 4A and 4B show an astigmatism curve and a distortion curve of an optical imaging lens assembly according to embodiment 2 respectively.
Figure 4B:
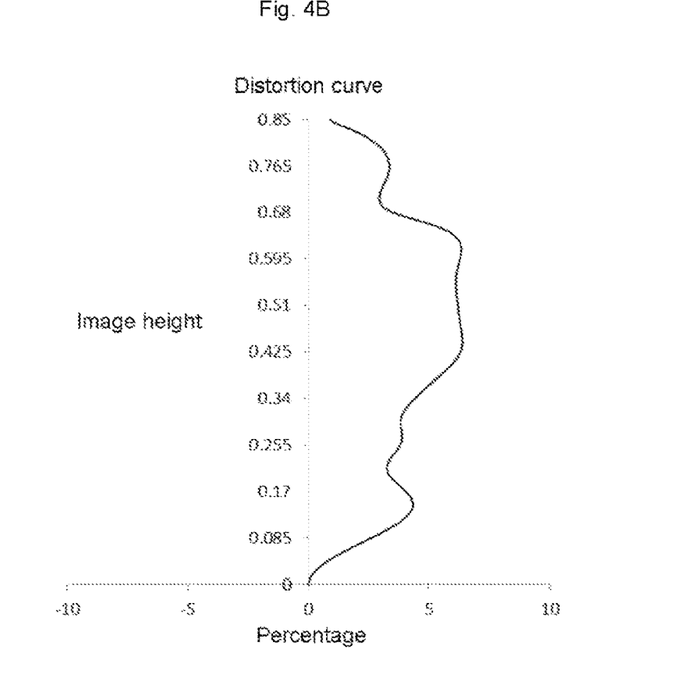

FIG. 4A shows an astigmatism curve of the optical imaging lens assembly according to embodiment 2 to represent a tangential image surface curvature and a sagittal image surface curvature. FIG. 4B shows a distortion curve of the optical imaging lens assembly according to embodiment 2 to represent distortion values corresponding to different image heights. According to FIGS. 4A and 4B, it can be seen that the optical imaging lens assembly provided in embodiment 2 may achieve high imaging quality.

Embodiment 3

Figure 5:
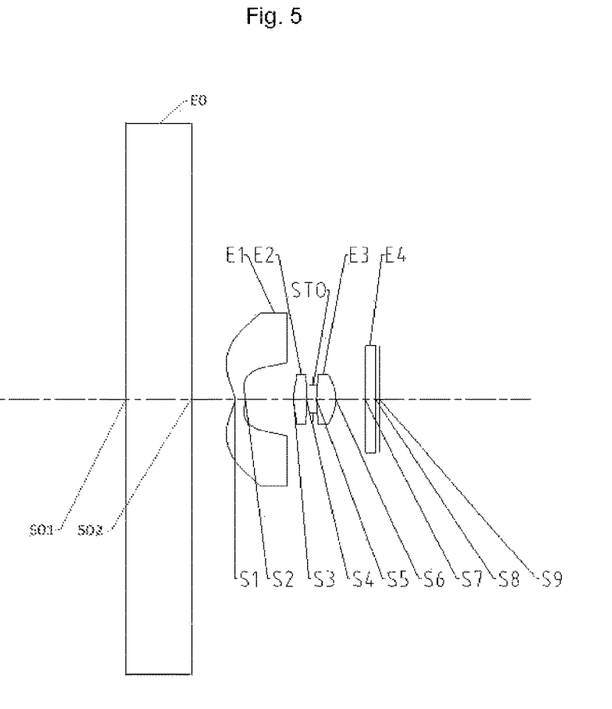
FIG. 5 shows a structure diagram of an optical imaging lens assembly according to embodiment 3 of the disclosure.

An optical imaging lens assembly according to embodiment 3 of the disclosure will be described below with reference to FIGS. 5 to 6B. FIG. 5 shows a structure diagram of an optical imaging lens assembly according to embodiment 3 of the disclosure.

As shown in FIG. 5, the optical imaging lens assembly sequentially includes, from an object side to an image side, a glass screen E0, a first lens E1, a second lens E2, a diaphragm STO, a third lens E3, an optical filter E4, and an imaging surface S9.

The glass screen E0 has an object-side surface S01 and an image-side surface S02. The first lens E1 has a negative refractive power, an object-side surface S1 thereof is a concave surface, while an image-side surface S2 is a convex surface. The second lens E2 has a positive refractive power, an object-side surface S3 thereof is a convex surface, while an image-side surface S4 is a convex surface. The third lens E3 has a positive refractive power, an object-side surface S5 thereof is a convex surface, while an image-side surface S6 is a convex surface. The optical filter E4 has an object-side surface S7 and an image-side surface S8. Light from an object sequentially penetrates through each of the surfaces S01 to S8 and is finally imaged on the imaging surface S9.

In the example, a total effective focal length f of the optical imaging lens assembly is 0.33 mm. TTL is a total length of the optical imaging lens assembly, and TTL is 2.85 mm. ImgH is a half of a diagonal length of an effective pixel region on the imaging surface S9 of the optical imaging lens assembly, ImgH is 1.00 mm. FOV is a field of view of the optical imaging lens assembly, and FOV is maximally 125.8°.

Table 5 shows a basic parameter table of the optical imaging lens assembly of embodiment 3, and units of the curvature radius, the thickness/distance and the focal length are all millimeter (mm). Table 6 shows high-order coefficients that can be used for each aspheric mirror surface in embodiment 3. A surface type of each aspheric surface may be defined by the formula (1) given in embodiment 1.

TABLE 5

| Surface number | Surface type | Curvature radius | Thickness/ distance | Material | | Focal length | Conic coefficient |
| | | | | Refractive index | Abbe number | | |
|---|---|---|---|---|---|---|---|
| OBJ | Spherical | Infinite | 1.2978E−06 | | | | |
| S01 | Spherical | Infinite | 1.2978 | 1.52 | 64.2 | | |
| S02 | Spherical | Infinite | 0.8500 | | | | |
| S1 | Aspherical | −0.1157 | 0.2083 | 1.54 | 56.1 | −1.19 | −9.6700 |
| S2 | Aspherical | −0.2301 | 0.9464 | | | | −19.5870 |
| S3 | Aspherical | 0.9111 | 0.2604 | 1.54 | 56.1 | 1.48 | −4.3046 |
| S4 | Aspherical | −6.4446 | 0.1270 | | | | 99.0000 |
| STO | Spherical | Infinite | 0.0659 | | | | |
| S5 | Aspherical | 1.5992 | 0.3808 | 1.54 | 56.1 | 0.90 | −31.2697 |
| S6 | Aspherical | −0.6473 | 0.5767 | | | | −0.7095 |
| S7 | Spherical | Infinite | 0.2100 | 1.52 | 64.2 | | |
| S8 | Spherical | Infinite | 0.0767 | | | | |
| S9 | Spherical | Infinite | | | | | |

TABLE 6

| Surface number | A4 | A6 | A8 | A10 | A12 |
|---|---|---|---|---|---|
| S1 | −3.2923E+00 | 3.6914E+01 | −1.7212E+02 | 4.7570E+02 | −8.6891E+02 |
| S2 | 1.7095E+01 | −2.7847E+02 | −2.8260E+03 | 1.8762E+05 | −3.3633E+06 |
| S3 | −5.1175E+00 | 4.8422E+02 | −2.4584E+04 | 7.6960E+05 | −1.6101E+07 |
| S4 | 1.7422E+01 | −2.9222E+03 | 2.6906E+05 | −1.5612E+07 | 6.0903E+08 |
| S5 | −1.2918E+01 | 2.6415E+03 | −3.0111E+05 | 2.1530E+07 | −1.0287E+09 |
| S6 | 7.5297E+00 | −8.8281E+02 | 5.6983E+04 | −2.2312E+06 | 5.7794E+07 |

| Surface number | A14 | A16 | A18 | A20 |
|---|---|---|---|---|
| S1 | 1.1081E+03 | −1.0163E+03 | 6.7986E+02 | −3.3222E+02 |
| S2 | 3.4548E+07 | −2.3440E+08 | 1.1075E+09 | −3.7135E+09 |
| S3 | 2.3523E+08 | −2.4621E+09 | 1.8689E+10 | −1.0296E+11 |
| S4 | −1.6629E+10 | 3.2553E+11 | −4.6247E+12 | 4.7740E+13 |
| S5 | 3.4224E+10 | −8.1299E+11 | 1.3968E+13 | −1.7389E+14 |
| S6 | −1.0398E+09 | 1.3369E+10 | −1.2457E+11 | 8.4314E+11 |

Figure 6A:
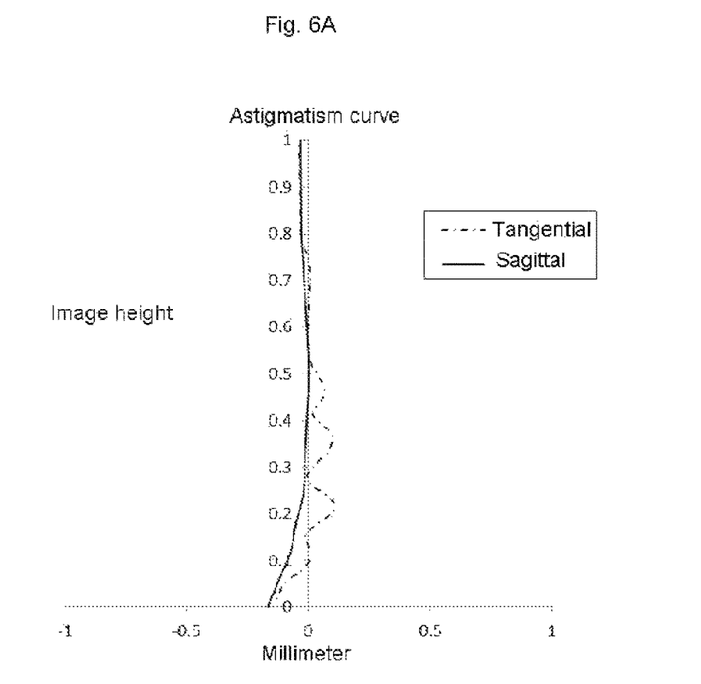
FIGS. 6A and 6B show an astigmatism curve and a distortion curve of an optical imaging lens assembly according to embodiment 3 respectively.
Figure 6B:
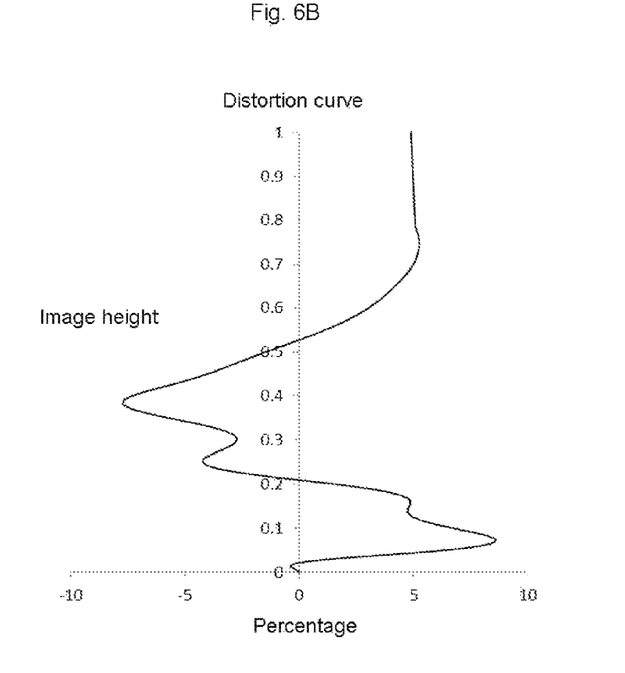

FIG. 6A shows an astigmatism curve of the optical imaging lens assembly according to embodiment 3 to represent a tangential image surface curvature and a sagittal image surface curvature. FIG. 6B shows a distortion curve of the optical imaging lens assembly according to embodiment 3 to represent distortion values corresponding to different image heights. According to FIGS. 6A and 6B, it can be seen that the optical imaging lens assembly provided in embodiment 3 may achieve high imaging quality.

Embodiment 4

Figure 7:
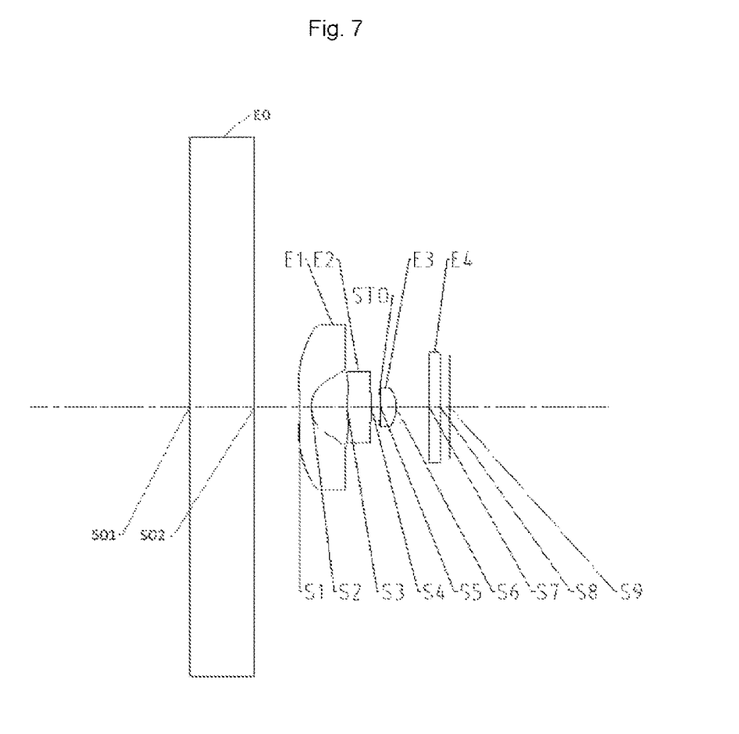
FIG. 7 shows a structure diagram of an optical imaging lens assembly according to embodiment 4 of the disclosure.

An optical imaging lens assembly according to embodiment 4 of the disclosure will be described below with reference to FIGS. 7 to 8B. FIG. 7 shows a structure diagram of an optical imaging lens assembly according to embodiment 4 of the disclosure.

As shown in FIG. 7, the optical imaging lens assembly sequentially includes, from an object side to an image side, a glass screen E0, a first lens E1, a second lens E2, a diaphragm STO, a third lens E3, an optical filter E4, and an imaging surface S9.

The glass screen E0 has an object-side surface S01 and an image-side surface S02. The first lens E1 has a negative refractive power, an object-side surface S1 thereof is a concave surface, while an image-side surface S2 is a concave surface. The second lens E2 has a positive refractive power, an object-side surface S3 thereof is a convex surface, while an image-side surface S4 is a convex surface. The third lens E3 has a positive refractive power, an object-side surface S5 thereof is a convex surface, while an image-side surface S6 is a convex surface. The optical filter E4 has an object-side surface S7 and an image-side surface S8. Light from an object sequentially penetrates through each of the surfaces S01 to S8 and is finally imaged on the imaging surface S9.

In the example, a total effective focal length f of the optical imaging lens assembly is 0.36 mm. TTL is a total length of the optical imaging lens assembly, and TTL is 2.82 mm. ImgH is a half of a diagonal length of an effective pixel region on the imaging surface S9 of the optical imaging lens assembly, ImgH is 0.95 mm. FOV is a field of view of the optical imaging lens assembly, and FOV is maximally 130.0°.

Table 7 shows a basic parameter table of the optical imaging lens assembly of embodiment 4, and units of the curvature radius, the thickness/distance and the focal length are all millimeter (mm). Table 8 shows high-order coefficients that can be used for each aspheric mirror surface in embodiment 4. A surface type of each aspheric surface may be defined by the formula (1) given in embodiment 1.

TABLE 7

| Surface number | Surface type | Curvature radius | Thickness/ distance | Material | | Focal length | Conic coefficient |
|---|---|---|---|---|---|---|---|
| | | | | Refractive index | Abbe number | | |
| OBJ | Spherical | Infinite | 1.2273E−06 | | | | |
| S01 | Spherical | Infinite | 1.2273 | 1.52 | 64.2 | | |
| S02 | Spherical | Infinite | 0.8512 | | | | |
| S1 | Aspherical | −2.7253 | 0.2139 | 1.54 | 56.1 | −0.77 | −90.1691 |
| S2 | Aspherical | 0.5145 | 0.6765 | | | | −0.4457 |
| S3 | Aspherical | 1.4926 | 0.4618 | 1.54 | 56.1 | 1.38 | −5.0062 |
| S4 | Aspherical | −1.3506 | 0.1411 | | | | −22.1519 |
| STO | Spherical | Infinite | 0.0323 | | | | |
| S5 | Aspherical | 4.1943 | 0.2946 | 1.54 | 56.1 | 0.78 | −31.1866 |
| S6 | Aspherical | −0.4632 | 0.6248 | | | | −0.5586 |
| S7 | Spherical | Infinite | 0.2100 | 1.52 | 64.2 | | |
| S8 | Spherical | Infinite | 0.1665 | | | | |
| S9 | Spherical | Infinite | | | | | |

TABLE 8

| Surface number | A4 | A6 | A8 | A10 | A12 |
|---|---|---|---|---|---|
| S1 | −2.0879E−02 | 1.5927E+00 | −4.9966E+00 | 9.5612E+00 | −1.4043E+01 |
| S2 | −6.3109E+00 | 1.7988E+02 | 4.6161E+02 | −1.0211E+05 | 2.2201E+06 |
| S3 | 1.2322E+00 | −5.0247E+01 | 4.3077E+02 | 2.7771E+03 | −1.2192E+05 |
| S4 | 2.9934E+01 | −4.3923E+03 | 3.5968E+05 | −1.8561E+07 | 6.3840E+08 |
| S5 | −3.1303E+01 | 1.0678E+04 | −2.1782E+06 | 2.8068E+08 | −2.4102E+10 |
| S6 | 3.2456E+01 | −3.9320E+03 | 2.7744E+05 | −1.2479E+07 | 3.8154E+08 |

| Surface number | A14 | A16 | A18 | A20 |
|---|---|---|---|---|
| S1 | 1.6865E+01 | −1.6077E+01 | 1.1452E+01 | −5.7453E+00 |
| S2 | −2.5716E+07 | 1.8998E+08 | −9.5487E+08 | 3.3503E+09 |
| S3 | 1.6247E+06 | −1.3156E+07 | 7.2988E+07 | −2.8729E+08 |
| S4 | −1.5098E+10 | 2.4823E+11 | −2.8054E+12 | 2.0750E+13 |
| S5 | 1.4312E+12 | −6.0179E+13 | 1.8146E+15 | −3.9306E+16 |
| S6 | −8.2476E+09 | 1.2889E+11 | −1.4702E+12 | 1.2218E+13 |

Figure 8A:
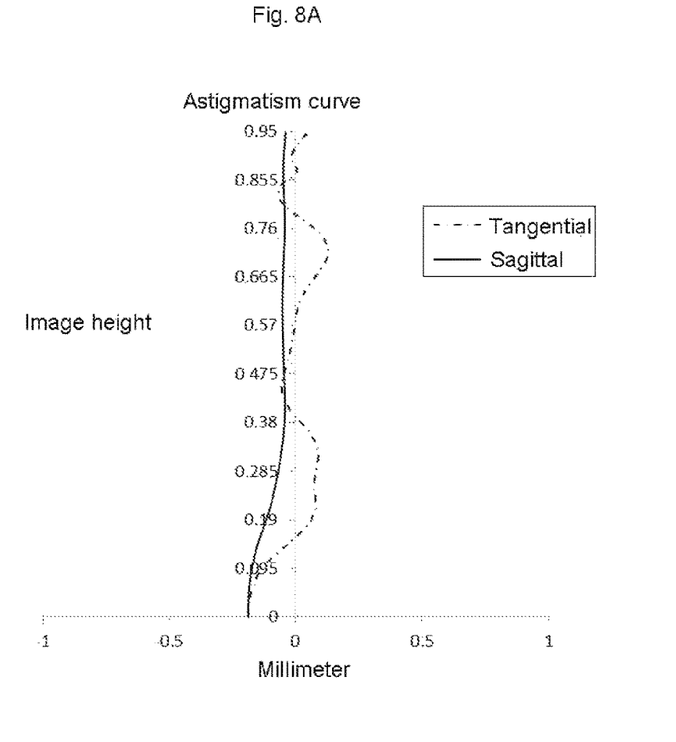
FIGS. 8A and 8B show an astigmatism curve and a distortion curve of an optical imaging lens assembly according to embodiment 4 respectively.
Figure 8B:
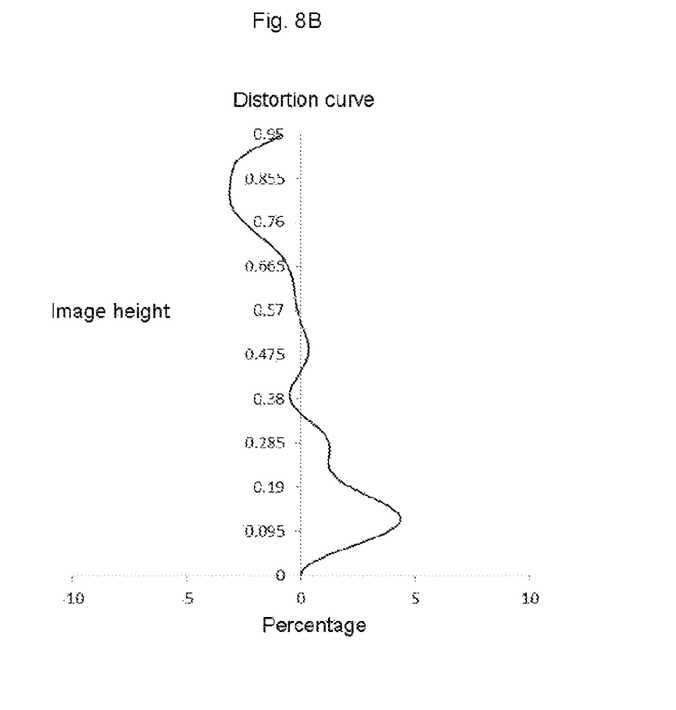

FIG. 8A shows an astigmatism curve of the optical imaging lens assembly according to embodiment 4 to represent a tangential image surface curvature and a sagittal image surface curvature. FIG. 8B shows a distortion curve of the optical imaging lens assembly according to embodiment 4 to represent distortion values corresponding to different image heights. According to FIGS. 8A and 8B, it can be seen that the optical imaging lens assembly provided in embodiment 4 may achieve high imaging quality.

From the above, embodiment 1 to embodiment 4 meet a relationship shown in Table 9 respectively.

TABLE 9

| Conditional expression/embodiment | 1 | 2 | 3 | 4 |
|---|---|---|---|---|
| f/EPD | 1.63 | 1.58 | 1.55 | 1.58 |
| FOV(°) | 127.7 | 127.8 | 125.8 | 130.0 |
| (f1 + f2)/f | 1.46 | 1.83 | 0.87 | 1.69 |
| f3/(R5 + R6) | 0.65 | 0.40 | 0.94 | 0.21 |
| ImgH/CT2 | 1.96 | 3.32 | 3.85 | 2.06 |
| TTL/CT3 | 7.23 | 7.61 | 7.49 | 9.58 |
| DT11/(DT21 + DT22) | 1.49 | 1.90 | 1.92 | 1.54 |
| DT21/DT31 | 1.83 | 1.90 | 1.37 | 2.49 |
| V1 | 56.1 | 56.1 | 56.1 | 56.1 |
| TTL/SL | 2.09 | 2.10 | 2.18 | 2.12 |
| TTL/BFL | 3.07 | 3.05 | 3.30 | 2.82 |
| f23/f | 1.74 | 1.75 | 2.20 | 1.81 |
| (SAG11 + SAG12)/T12 | 1.74 | 1.50 | 1.42 | 1.50 |
| ET1/CT1 | 2.27 | 2.06 | 2.40 | 2.20 |

The disclosure also provides a fingerprint identification device, which includes the above-described optical imaging lens assembly. Moreover, an image sensor in the fingerprint identification device may be configured to convert an optical signal entering the image sensor from the optical imaging lens assembly into an electric signal.

The disclosure also provides an imaging device, of which an electronic photosensitive element may be a Charge Coupled Device (CCD) or a Complementary Metal Oxide Semiconductor (CMOS). The imaging device may be an independent imaging device such as a digital camera, or may be an imaging module integrated into a mobile electronic device such as a mobile phone. The imaging device is provided with the above-mentioned optical imaging lens assembly.

The above description is only description about the preferred embodiments of the disclosure and adopted technical principles. It is understood by those skilled in the art that the scope of invention involved in the disclosure is not limited to the technical solutions formed by specifically combining the technical characteristics and should also cover other technical solutions formed by freely combining the technical characteristics or equivalent characteristics thereof without departing from the inventive concept, for example, technical solutions formed by mutually replacing the characteristics and (but not limited to) the technical characteristics with similar functions disclosed in the disclosure.

What is claimed is:

1. An optical imaging lens assembly, sequentially comprising, from an object side to an image side along an optical axis:
   a first lens with a negative refractive power, an object-side surface thereof being a concave surface;
   a second lens with a positive refractive power, an object-side surface thereof being a convex surface; and
   a third lens with a positive refractive power, an object-side surface thereof being a convex surface while an image-side surface being a convex surface, the optical imaging lens assembly further comprises a diaphragm, the diaphragm is arranged between the second lens and the third lens,
   wherein EPD is an entrance pupil diameter of the optical imaging lens assembly, and a total effective focal length f of the optical imaging lens assembly and EPD meet f/EPD<1.65; and
   FOV is a maximum field of view of the optical imaging lens assembly, and FOV meets 125°<FOV<140°;
   SL is a distance from the diaphragm to an imaging surface of the optical imaging lens assembly on the optical axis, TTL is a distance from the object-side surface of the first lens to the imaging surface of the optical imaging lens assembly on the optical axis, SL and TLL meet 2.0<TTL/SL<2.5;
   TTL is a distance from the object-side surface of the first lens to an imaging surface of the optical imaging lens assembly on the optical axis, BFL is a distance from the image-side surface of the third lens to the imaging surface of the optical imaging lens assembly on the optical axis, TTL and BFL meet 2.7<TTL/BFL<3.4.

2. The optical imaging lens assembly according to claim 1, wherein an effective focal length f1 of the first lens, an effective focal length f2 of the second lens and the total effective focal length f of the optical imaging lens assembly meet 0.7<(f1+f2)/f<1.9.

3. The optical imaging lens assembly according to claim 1, wherein ImgH is a half of a diagonal length of an effective pixel region on an imaging surface of the optical imaging lens assembly, ImgH and a center thickness CT2 of the second lens on the optical axis meet 1.8<ImgH/CT2<4.0.

4. The optical imaging lens assembly according to claim 1, wherein TTL is a distance from the object-side surface of the first lens to an imaging surface of the optical imaging lens assembly, TTL and a center thickness CT3 of the third lens on the optical axis meet 7.0<TTL/CT3<10.0.

5. The optical imaging lens assembly according to claim 1, wherein an effective radius DT11 of the object-side surface of the first lens, an effective radius DT21 of the object-side surface of the second lens and an effective radius DT22 of an image-side surface of the second lens meet 1.4<DT11/(DT21+DT22)<2.1.

6. The optical imaging lens assembly according to claim 1, wherein an effective radius DT31 of the object-side surface of the third lens and an effective radius DT21 of the object-side surface of the second lens meet 1.3<DT21/DT31<2.6.

7. The optical imaging lens assembly according to claim 1, wherein an Abbe number V1 of the first lens meets 50<V1<70.

8. The optical imaging lens assembly according to claim 1, wherein f23 is a combined focal length of the second lens and the third lens, f23 and the total effective focal length f of the optical imaging lens assembly meet 1.6<f23/f<2.4.

9. The optical imaging lens assembly according to claim 1, wherein SAG11 is a distance from an intersection point of the object-side surface of the first lens and the optical axis to an effective radius vertex of the object-side surface of the first lens on the optical axis, SAG12 is a distance from an intersection point of an image-side surface of the first lens and the optical axis to an effective radius vertex of the image-side surface of the first lens on the optical axis, and SAG11, SAG12 and a spacing distance T12 of the first lens and the second lens on the optical axis meet 1.2<(SAG11+SAG12)/T12<1.9.

10. The optical imaging lens assembly according to claim 1, wherein an edge thickness ET1 of the first lens and a center thickness CT1 of the first lens on the optical axis meet 1.9<ET1/CT1<2.5.

11. The optical imaging lens assembly according to claim 1, wherein an effective focal length f3 of the third lens, a curvature radius R6 of the image-side surface of the third lens and a curvature radius R5 of the object-side surface of the third lens meet 0.1<f3/(R5+R6)<1.1.

12. An optical imaging lens assembly, sequentially comprising, from an object side to an image side along an optical axis:
a first lens with a negative refractive power, an object-side surface thereof being a concave surface;
a second lens with a positive refractive power, an object-side surface thereof being a convex surface; and
a third lens with a positive refractive power, an object-side surface thereof being a convex surface while an image-side surface being a convex surface, the optical imaging lens assembly further comprises a diaphragm, the diaphragm is arranged between the second lens and the third lens,
wherein EPD is an entrance pupil diameter of the optical imaging lens assembly, and a total effective focal length f of the optical imaging lens assembly and EPD meet f/EPD<1.65; and
TTL is a distance from the object-side surface of the first lens to an imaging surface of the optical imaging lens assembly, TTL and a center thickness CT3 of the third lens on the optical axis meet 7.0<TTL/CT3<10.0;
SL is a distance from the diaphragm to an imaging surface of the optical imaging lens assembly on the optical axis, TTL is a distance from the object-side surface of the first lens to the imaging surface of the optical imaging lens assembly on the optical axis, SL and TLL meet 2.0<TTL/SL<2.5;
TTL is a distance from the object-side surface of the first lens to an imaging surface of the optical imaging lens assembly on the optical axis, BFL is a distance from the image-side surface of the third lens to the imaging surface of the optical imaging lens assembly on the optical axis, TTL and BFL meet 2.7<TTL/BFL<3.4.

13. The optical imaging lens assembly according to claim 12, wherein an effective focal length f1 of the first lens, an effective focal length f2 of the second lens and the total effective focal length f of the optical imaging lens assembly meet 0.7<(f1+f2)/f<1.9.

14. The optical imaging lens assembly according to claim 12, wherein ImgH is a half of a diagonal length of an effective pixel region on the imaging surface of the optical imaging lens assembly, ImgH and a center thickness CT2 of the second lens on the optical axis meet 1.8<ImgH/CT2<4.0.

15. The optical imaging lens assembly according to claim 12, wherein an effective radius DT11 of the object-side surface of the first lens, an effective radius DT21 of the object-side surface of the second lens and an effective radius DT22 of an image-side surface of the second lens meet 1.4<DT11/(DT21+DT22)<2.1.

16. The optical imaging lens assembly according to claim 12, wherein an effective radius DT31 of the object-side surface of the third lens and an effective radius DT21 of the object-side surface of the second lens meet 1.3<DT21/DT31<2.6.

17. The optical imaging lens assembly according to claim 12, wherein an Abbe number V1 of the first lens meet 50<V1<70.

18. A fingerprint identification device, comprising:
the optical imaging lens assembly according to claim 1, further comprising a glass screen on an object side; and
an image sensor, configured to convert an optical signal entering the image sensor from the optical imaging lens assembly into an electric signal.

* * * * *